United States Patent [19]

Matsumoto et al.

[11] 4,263,782
[45] Apr. 28, 1981

[54] COMBINED SPLIT ENGINE AND FEEDBACK CONTROLLED ENGINE OPERATIONS

[75] Inventors: Junichiro Matsumoto; Haruhiko Iizuka, both of Yokosuka; Fukashi Sugasawa, Yokohama, all of Japan

[73] Assignee: Nissan Motor Company, Limited, Yokohama, Japan

[21] Appl. No.: 52,431

[22] Filed: Jun. 26, 1979

[30] Foreign Application Priority Data

Jun. 30, 1978 [JP] Japan .................................. 53-78652

[51] Int. Cl.³ .......................... F01N 3/15; F02D 17/00
[52] U.S. Cl. ......................................... 60/276; 60/301; 123/489; 123/198 F
[58] Field of Search ............. 60/276, 301; 123/32 EE, 123/119 EC, 198 F, 489, 440

[56] References Cited

U.S. PATENT DOCUMENTS

| | | | |
|---|---|---|---|
| 3,767,764 | 10/1973 | Dolbear | 60/301 |
| 3,984,975 | 10/1976 | Price | 60/301 |
| 4,107,921 | 8/1978 | Iizuka | 123/198 F |
| 4,114,374 | 9/1978 | Tanahashi | 123/198 F |
| 4,134,261 | 1/1979 | Iizuka | 60/276 |
| 4,149,502 | 4/1979 | Johnson | 60/276 |

Primary Examiner—Douglas Hart
Attorney, Agent, or Firm—Schwartz, Jeffery, Schwaab, Mack, Blumenthal & Koch

[57] ABSTRACT

A control system for a multi-cylinder internal combustion engine comprises a split engine control unit for operating the engine on partial cylinders when reduced engine power can adequately operate the vehicle, and first and second exhaust conduits for directing exhaust gases from first and second group cylinders respectively to a common junction to which a common exhaust conduit is connected for directing the gases to the atmosphere. A first set of an exhaust gas sensor and catalytic converter is disposed in the second conduit to be exposed to the stream of gases exhausted from the second group cylinders which are activated at all times and a second set of an exhaust gas sensor and catalytic converter is disposed in the common conduit to be exposed to the stream of gases exhausted from the first group cylinders directed through the first conduit and to the gases passed through the upstream side catalytic converter in the second conduit. Feedback mixture control operation is effected on the basis of the signal from the first exhaust gas sensor during the partial cylinder mode and a full cylinder mode in which the second gas sensor is still below its normal operating temperature. The signal from the second gas sensor is utilized for the feedback operation in the full cylinder mode in which the temperature of the latter sensor is above its normal operating point.

5 Claims, 4 Drawing Figures

COMBINED SPLIT ENGINE AND FEEDBACK CONTROLLED ENGINE OPERATIONS

BACKGROUND OF THE INVENTION

The present invention relates to control systems for multiple cylinder internal combustion engines, and in particular to a control system which combines closed-loop mixture control and split engine operations.

It is known that fuel economy is achieved under light load conditions by operating a multiple cylinder engine on partial cylinders if the reduced engine power can adequately operate the vehicle. When the engine load is relatively heavy the engine is operated on full cylinders. The whole cylinders are divided into a first group which is operated only during heavy load conditions and a second group which is operated at all times. This method of engine control is known as split engine operation. On the other hand, closed-loop mixture control systems are also known and widely used as an effective means of eliminating noxious gaseous components. Such systems employ an exhaust gas sensor and a three-way catalytic converter disposed downstream of the gas sensor to effect simultaneous oxidation of hydrocarbon and monoxide and reduction of nitrogen oxides when the air-fuel ratio is precisely controlled to within a predetermined range, known as converter window which corresponds to the stoichiometric air-fuel ratio.

However, the above known methods cannot be combined together without giving rise to a problem in that the deactivated cylinders operate as a pump to introduce air into the exhaust system thereby increasing oxygen contents in the emissions, which results in a false gas sensor signal. To eliminate this problem, a prior method involved the use of a shutoff valve to direct the stream of pumped air through a passage that bypasses the catalytic converter during partial cylinder mode, and switch the direction of the gas flow to the catalytic converter during the full cylinder mode.

However, because of the inherent delay time it takes the exhaust gas to reach the location of the shutoff valve, the signal that controls the shutoff valve must be precisely timed in relation to the delay time and if improperly timed a false gas sensor signal would result. Copending U.S. patent applications U.S. Ser. No. 046,309, filed June 7, 1979; U.S. Ser. No. 046,350, filed June 7, 1979; and U.S. Ser. No. 048,156, filed June 13, 1979 disclose a system in which split engine control and feedback mixture control are properly combined by the use of a first and second exhaust conduits respectively connected to the first and second group cylinders and a common exhaust passage downstream of the first and second exhaust conduits for directing the gases exhausted through the upstream side first and second exhaust conduits. A first set of gas sensor and catalytic converter is disposed in the second exhaust conduit and a second set of gas sensor and catalytic converter is disposed in the common conduit. The feedback control circuit is selectively responsive to the gas concentration signal provided by the first or upstream side gas sensor when the engine is operated on the second group cylinders (partial cylinder mode) or responsive to the signal from the downstream side gas sensor when the engine is operated on full cylinders (full cylinder mode).

During the partial cylinder mode, however, the air pumped through the deactivated first group cylinders tend to reduce the temperature of the downstream side gas sensor as well as the downstream side catalytic converter to thereby reduce its conversion efficiency. Therefore, when the engine operational mode is switched from partial to full cylinder modes, the signal from the downstream side gas sensor is inappropriate for feedback control operation for a certain interval of time.

SUMMARY OF THE PRESENT INVENTION

An object of the present invention is to eliminate the aforementioned problem by allowing the signal from the first or upstream side gas sensor to be utilized for feedback control operation when the engine operational mode is switched from partial to full cylinder modes until the temperature of the second or downstream side gas sensor rises above its normally operating point, whereupon the signal from the latter sensor seizes control of the feedback operation.

To achieve this object, the present invention contemplates the use of a temperature sensing electrical circuit which is connected to the downstream side gas sensor disposed in the common exhaust passage. This sensing circuit is characterized by the inclusion of a constant current source for providing a constant current flow to the downstream gas sensor to develop a voltage across the internal impedance of the latter sensor. Since the low temperature condition of the gas sensor causes its internal impedance to rise to a considerably high level, the current flow into the gas sensor during such low temperature conditions will generate a high voltage across the internal impedance of the downstream side gas sensor. This voltage decreases with a temperature rise, so that a comparator can detect when the downstream gas sensor is above its normally operating temperature by sensing a reduction in voltage level of the output of downstream side gas sensor. A switch is provided which normally couples the output of upstream gas sensor to the feedback control circuit to permit it to effect feedback control based on the gas concentration of emissions from the second group cylinders when the engine is operated on partial cylinders or when the engine operational mode is switched from the partial to full cylinder mode and the temperature of the downstream gas sensor is below its normally operating point. This switch is operated in response to an output of the comparator sensing the high temperature condition of the downstream side gas sensor to permit the feedback control circuit to respond to the signal from the downstream side gas sensor.

A clamping circuit is also provided which is responsive to a voltage level detector when the latter senses a low voltage condition of the upstream side gas sensor through the switch in its normal position in order that the output of the feedback control circuit is clamped to a predetermined voltage level. This clamping circuit is useful for engine operation during cold start periods.

BRIEF DESCRIPTION OF THE DRAWINGS

The invention will be further described by way of example with reference to the accompanying drawings, in which.

DETAILED DESCRIPTION

Figure 1:
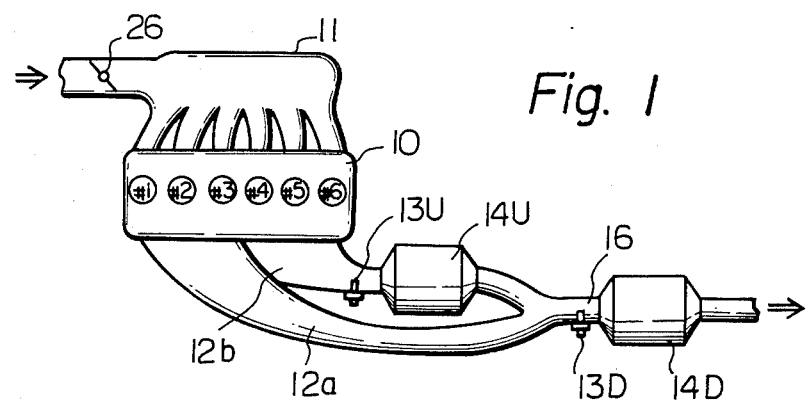
FIG. 1 is a schematic diagrammatic view of the exhaust system of the invention.

In FIG. 1 the engine control system of the invention is shoWn as comprising a first exhaust conduit 12a connected to the first group cylinders No. 1 to No. 3 for leading the exhaust gases therefrom to a common exhaust conduit 16 and a second exhaust conduit 12b connected to the second group cylinders No. 4 to No. 6 for leading the exhaust gases therefrom to the common passage 16 through a first or upstream three-way catalytic converter 14U. A first exhaust gas sensor or oxygen sensor 13U is mounted in the conduit 12b upstream of catalytic converter 14U and a second or downstream exhaust gas sensor 13D and a second or downstream three-way catalytic converter 14D are mounted in the common passage 16, the latter being downstream of the sensor 13D.

Figure 2:
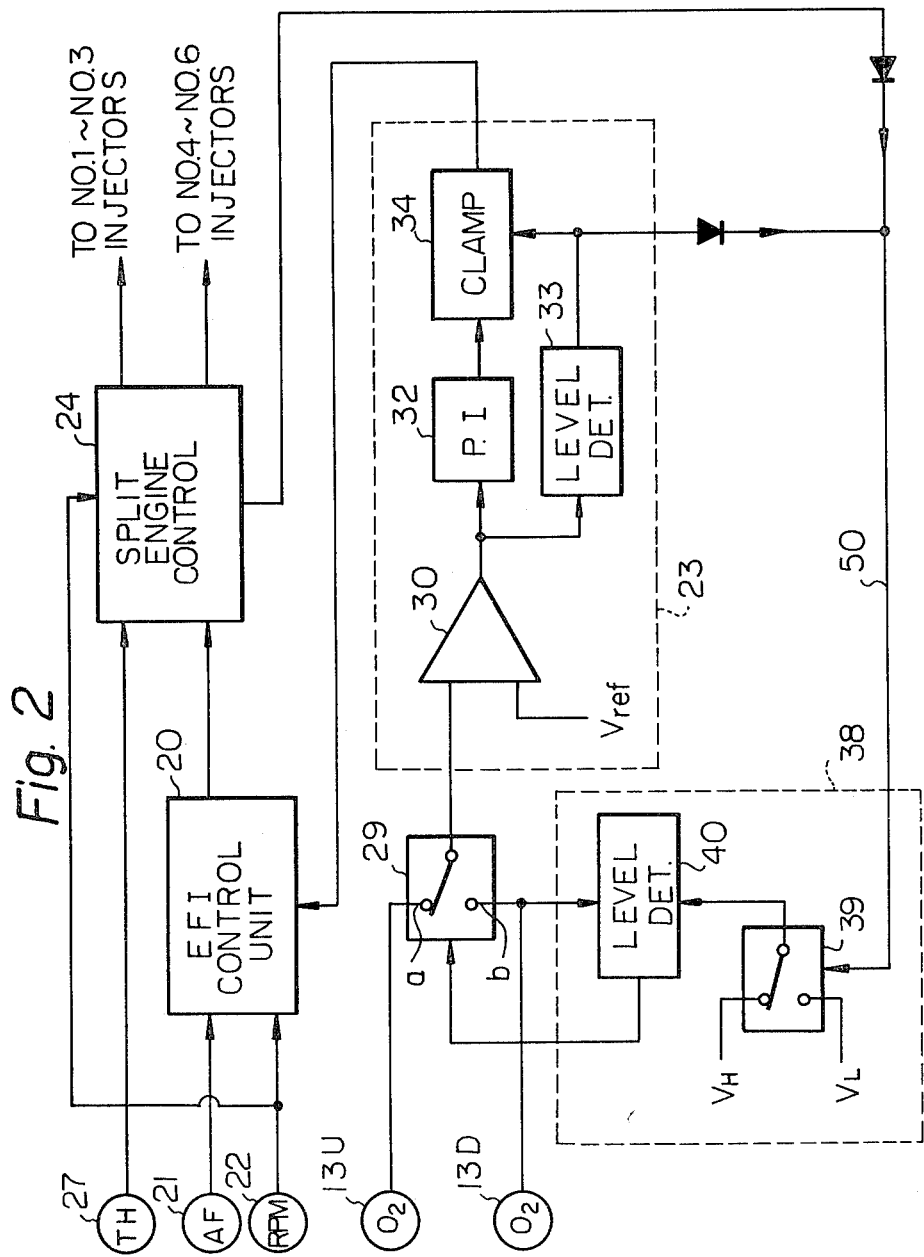
FIG. 2 is a circuit diagram according to the invention associated with the exhaust system of FIG. 1.

FIG. 2 is an illustration of the control circuit of the invention. An electronic fuel injection control unit 20 takes its inputs from an intake air flow sensor 21 and from an engine speed sensor 22 and computes on these input data to obtain an air quantity taken in per engine crankshaft revolution and derives an injection pulse with a length proportional to the computed air quantity that represents the engine output power or load. The injection pulse is supplied in synchronism with crankshaft revolution to a split engine control circuit 24 and thence to the first group cylinders No. 1 to No 3 and also to the second group cylinders No. 4 to No. 6. The split engine control circuit 24 is also responsive to signals from the engine speed sensor 22 and from a throttle position sensor 27 which is connected to the throttle control valve 26 disposed in the intake air passage 11. The throttle position sensor 27 provides a signal indicating that the throttle control valve 26 is open. In the presence of a throttle-open signal from the throttle position sensor 27, the split engine control circuit 24 detects when the engine speed falls below a preselected value. The split engine control circuit 24 includes means responsive to the pulse length of the injection pulse to detect the magnitude of engine load to generate a partial cylinder mode command signal when the detected engine load is below a preselected value.

During the full cylinder mode, injection control pulses are supplied to all the fuel injectors No. 1 to No. 6, and during the partIal cylinder mode the injection pulses to the No. 1 to No. 3 are disabled.

Under normal feedback loop operation, the signal from the controller 32 is fed through the clamp circuit 34 to the electronic fuel injection control unit 20 to correct the width of the injection pulse to maintain the air-fuel ratio of mixture supplied to the engine 10 at the stoichiometric point represented by the reference voltage $V_{ref}$. When the engine is operated at a reduced load the split engine control circuit 24 detects it by sensing the pulse length of the injection pulse becoming smaller than the preset value and provides a partial cylinder command, or logical "1" signal, to the switch 39, so that the detector 40 is fed with a low reference voltage $V_L$.

A feedback control circuit 23 is provided which includes a differential amplifier 30 having a first input terminal connected to the moving contact arm of the switch 29 for making a comparison with a reference voltage representing the stoichiometric air-fuel ratio. The comparator 30 provides an output signal at one of two discrete levels depending on whether the signal from the gas sensors is above or below the reference voltage and supplies its output to a proportional/integral controller 32 and thence to a clamping circuit 34. The feedback control circuit 23 further includes a monitor circuit or level detector 33 which serves to detect when the gas sensor 13U output level remains low during low temperature periods such as cold engine start and signals the clamping circuit 34 to permit it to clamp the control signal from the PI controller 32 at a constant or disabled level so as to suspend closed loop mixture control operation.

During the partial cylinder mode the noxious components are purified by means of the upstream side converter 14U, so that the downstream side converter 14D has no substantial purifying effect. When the engine load is above the preselected value, the split engine control unit 24 presents a logical "0" signal, or full-cylinder mode command signal, to the switch 39 so that the reference voltage to the level detector 40 is reset to a higher reference voltage $V_H$ which corresponds to the normal operating temperature of the gas sensor 13D. If the temperature of the gas sensor 13D is below its normally operating temperature, the input to the level detector 40 is very high as will be described later, so that the latter generates a logical "0" signal with the result that the signal from the downstream side gas sensor 13D is disabled and the signal from the upstream side gas sensor 13U is applied through the switch 29 to the differential amplifier 30. Therefore, the closed loop operation is based on the signal from the upstream gas sensor 13U if the temperature of the downstream side gas sensor 13D remains low, although the engine operational mode has already been switched from the partial to full cylinder modes. When the temperature of the downstream side gas sensor exceeds its normal operating temperature, the level detector 40 will generate a logical "1" signal to disable the signal from the gas sensor 13U and applies the signal from the gas sensor 13D to the input of differential amplifier 30.

Figure 3:
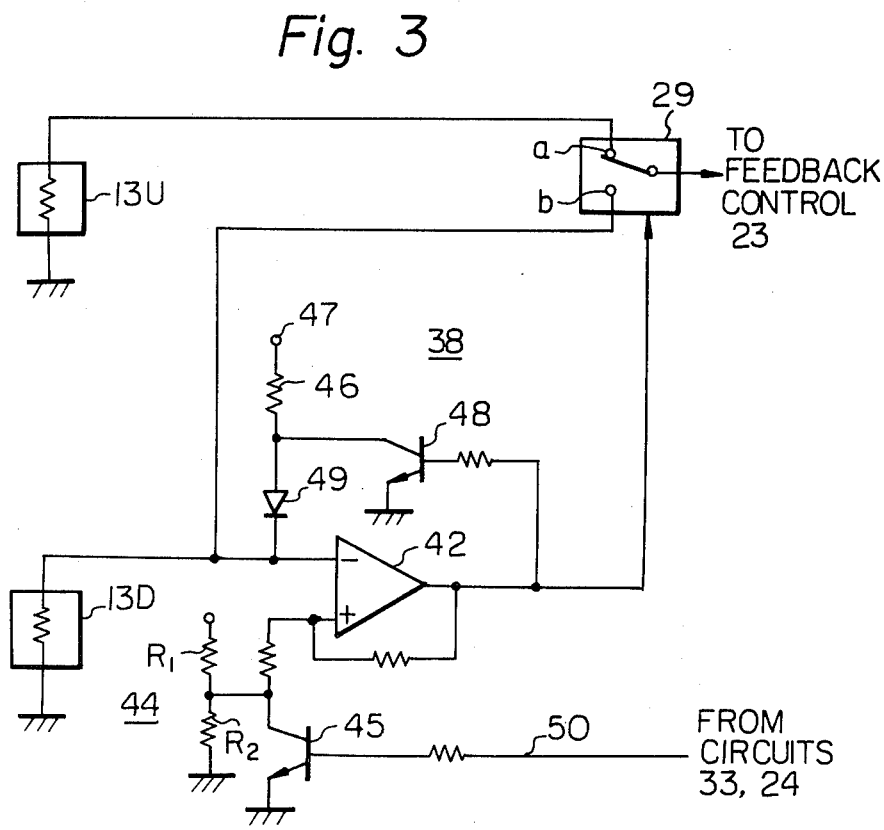
FIG. 3 shows details of the circuit of FIG. 2.

Details of the circuit 38 are shown in FIG. 3. The circuit 38 includes a constant current source including a voltage supply source or terminal 47, a resistor 46 and a diode 49 for passing a constant DC current into the downstream side gas sensor 13D to develop a voltage across the internal impedance of the sensor 13D. If the temperature of gas sensor 13D is below its normal operating temperature, the internal impedance thereof is considerably high, so that the passage of the constant DC current to the gas sensor 13D causes a high voltage to develop across its internal impedance, which voltage is an inverse function of the temperature of gas sensor 13D. The output signal from the gas sensor 13D is connected to the inverting input of a comparator 42 for making a comparison with a variable reference voltage which is supplied from a voltage divider 44 formed by series-connected resistors R1 and R2. The junction of the resistors R1 and R2 is connected to the collector of a switching transistor 45 for providing a short-circuit path across the resistor R2 in response to a signal applied to its base. A transistor 48 is further provided which has its base connected to the output of the comparator 42 and its collector-emitter path connected from the junction of resistor 46 and diode 49 to ground.

Figure 4:
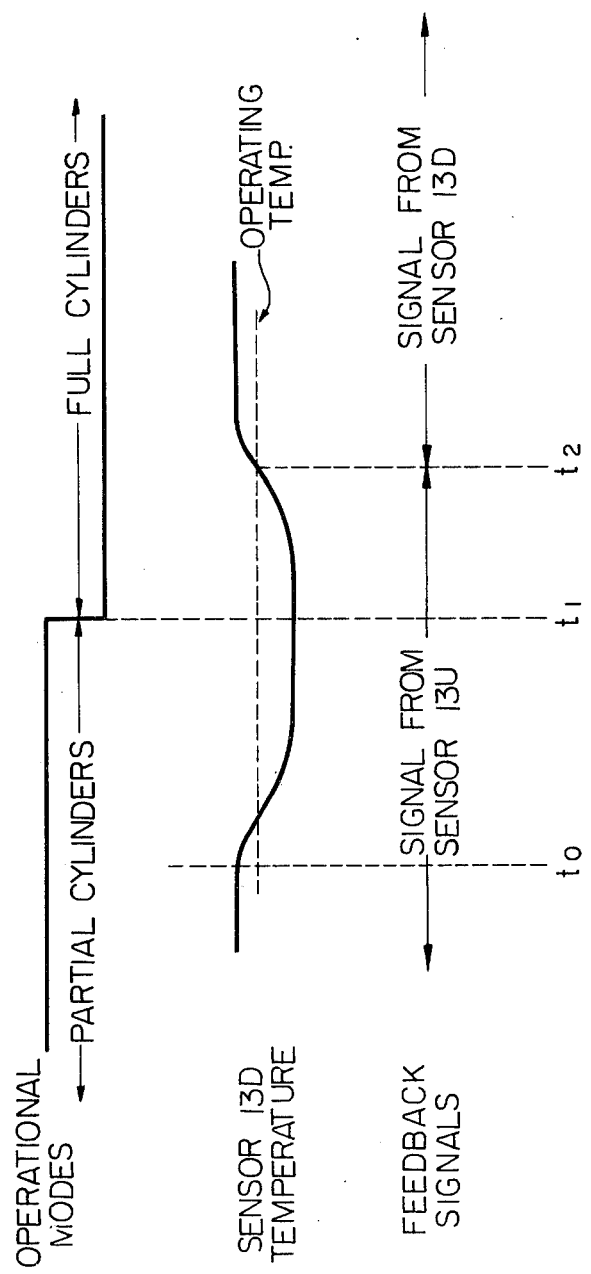
FIG. 4 is a waveform diagram useful for describing the operation of the invention.

When the engine is operated on partial cylinders until time $t_1$ (FIG. 4), the temperature of the downstream side gas sensor 13D will reduce to a level below its normal operating level at time $t_o$ and remain there until time $t_2$ after the engine operational mode is switched to the full cylinder operation. The partial cylinder command signal from the split engine control unit 24 is applied through line 50 to the transistor 45 to turn it on to apply a low reference voltage $V_L$ to the noninverting input of the comparator 42 so that its output voltage remains at logical "0" level with the result that the switch 29 is in the "a" contact position. This ensures that the closed loop operation is based on the signal from the upstream side gas sensor 13U. The switching of the engine operational mode from partial to full cylinders at time $t_1$ removes the bias signal from the base of transistor 45 to raise the reference voltage to $V_H$ which corresponds to the normal operating temperature of the gas sensor 13D. Since the temperature of downstream side gas sensor 13D is low at time $t_2$, the comparator 42 still remains in the logical "0" state to allow the signal from the upstream side gas sensor 13U to be coupled to the closed loop control circuit 23. At time $t_2$, the gas sensor 13D temperature rises above its normal operating point and the comparator 42 is switched to a logical "1" state which turns on transistor 48 to block the current flow into the gas sensor 13D and at the same time provides a control signal to the switch 29 to couple the signal from the gas sensor 13D to the closed loop control circuit 23 instead of the signal from the gas sensor 13U.

Therefore, the signal from the downstream side gas sensor 13D is disabled for an interval until its temperature rises above the normal operating point and instead the signal from the upstream side gas sensor 13U is utilized during that interval although the engine operational mode is switched to full cylinder operation.

When the signal from the downstream side gas sensor 13D is used for feedback control operation, the air fuel mixture is controlled to the stoichiometric point so that the concentration of the predetermined constituent gas in the emissions sensed in the common exhaust passage 16 is controlled to a point which permits the downstream side three-way catalytic converter 14D to operate at the maximum conversion efficiency.

Transistor 45 is also responsive to a clamping command signal from the level detector 33 to supply a low reference voltage to the comparator 42. This clamping signal is generated when the level detector 33 senses a low voltage level condition of the upstream side gas sensor 13U during cold engine start periods. Therefore, during engine cold start periods, the level detector 33 causes the output of the proportional-integral controller to be clamped to a preselected voltage level. When the temperature of the upstream side gas sensor 13U rises above its normal operating point, this condition is sensed by the level detector 33 which removes the clamp signal from the transistor 45 and from the clamping circuit 34 to allow the output from the controller 32 to modify the pulse width of the injection pulse based on the signal from the gas sensor 13U.

As understood from the foregoing description, the signal from the upstream gas sensor 13U is utilized whenever the downstream side gas sensor 13D remains at low temperatures, which condition is inadequate for closed loop operation and whenever the temperature of the upstream side gas sensor 13U is low, the closed loop operation is disabled by the clamping signal.

Although the present invention involves the use of two cascaded catalytic converters, the combined purifying capacity of the converters is approximately the capacity of a single converter employed solely to purify the gases exhausted from all the cylinders, since each converter is exposed to the gases exhausted from substantially one half of the full cylinders at all times.

What is claimed is:

1. A control system for an internal combustion engine having first and second cylinders, comprising:
   split engine control means for operating said engine on full cylinders in which said first and second cylinders are activated to give higher engine power when the magnitude of engine load is above a predetermined value and operating said engine on partial cylinder in which only said second cylinder is activated to give a lower engine power when the engine load magnitude is below said predetermined value;
   first and second exhaust conduits for passing exhaust gases from said first and second cylinders, respectively, to a common junction;
   a common exhaust conduit connected to said common junction for passing exhaust gases therethrough to the atmosphere;
   a first exhaust gas sensor and a first catalytic converter disposed in said second exhaust conduit
   a second exhaust gas sensor and a second catalytic converter disposed in said common conduit;
   feedback control means responsive to a signal from one of said first and second gas sensors for correcting the air-fuel ratio of mixture supplied to said engine;
   temperature sensing means for detecting when the temperature of said second gas sensor is above its normal operating point to generate a high temperature representative signal and detecting when said temperature is below said operating point to generate a low temperature representative signal;
   first means responsive to the simultaneous presence of said full cylinder engine operation and said high temperature representative signal for connecting a signal from said second exhaust gas sensor to said feedback control means; and
   second means responsive to the simultaneous presence of said full cylinder engine operation and said low temperature representative signal and responsive to said partial cylinder engine operation for connecting a signal from said first exhaust gas sensor to said feedback control means.

2. A control system as claimed in claim 1, wherein said temperature sensing means comprises:
   a constant current source for passing a constant current flow into said second exhaust gas sensor;
   a comparator having a first input terminal connected to said second exhaust gas sensor and a second input terminal connected to a reference voltage corresponding to the normal operating temperature of said second exhaust gas sensor for generating an output signal when the output of said second exhaust gas sensor is below said reference voltage, respectively; and
   means for disabling the passage of said constant current flow in response to said comparator output signal.

3. A control system as claimed in claim 2, wherein said first and second means comprises a switching circuit for selectively connecting a signal from said first exhaust gas sensor in the absence of said output signal from said comparator to said feedback control means and connecting a signal from said second exhaust gas sensor to said feedback control means in the presence of said output signal of said comparator, and means for causing said switching circuit to connect the signal from said first exhaust gas sensor in response to the presence of said partial cylinder engine operation.

4. A control system as claimed in claim 3, wherein said means for causing said switching circuit to connect said gas sensor signal comprises means for varying said reference voltage such that there is no output signal from said comparator.

5. A control system as claimed in claim 1, further comprising means for detecting when the temperature of said first exhaust gas sensor is low for clamping a signal from said feedback control means to a predetermined voltage level.

* * * * *